United States Patent
Pack et al.

(10) Patent No.: US 10,122,591 B1
(45) Date of Patent: Nov. 6, 2018

(54) MANAGING ACCESS TO NO-COST CONTENT

(71) Applicant: Google LLC, Mountain View, CA (US)

(72) Inventors: James Arnold Pack, Paris (FR); Bin Zhu, Norcross, GA (US); Wiktor Tomczak, Paris (FR); Joseph E. Provost, Paris (FR); Tim Emiola, Paris (FR); Jeff Robert Karplus Hartline, Paris (FR); Michael DePasquale, Paris (FR); Patrick Pui Wah Leung, Paris (FR); Christopher John DiGiano, Boulder, CO (US); AbdelKarim F. Mardini, Paris (FR)

(73) Assignee: Google LLC, Mountain View, CA (US)

( * ) Notice: Subject to any disclaimer, the term of this patent is extended or adjusted under 35 U.S.C. 154(b) by 859 days.

(21) Appl. No.: 13/798,823

(22) Filed: Mar. 13, 2013

(51) Int. Cl.
*H04L 12/24* (2006.01)

(52) U.S. Cl.
CPC .................. *H04L 41/50* (2013.01)

(58) Field of Classification Search
CPC .......... H04L 29/06; H04L 29/0809; H04L 29/08144; H04L 63/08; H04L 41/50
USPC .......................................... 709/225
See application file for complete search history.

(56) References Cited

U.S. PATENT DOCUMENTS

| | | | | |
|---|---|---|---|---|
| 6,968,175 | B2* | 11/2005 | Raivisto et al. | 455/406 |
| 7,127,232 | B2* | 10/2006 | O'Neil | H04L 12/1403 455/408 |
| 7,822,659 | B2* | 10/2010 | Haakana | 705/35 |
| 7,991,385 | B1* | 8/2011 | Rosenberg et al. | 455/406 |
| 8,122,128 | B2* | 2/2012 | Burke et al. | 709/225 |
| 8,898,293 | B2* | 11/2014 | Raleigh et al. | 709/224 |

(Continued)

OTHER PUBLICATIONS

'Free Zone' [online]. "Share and search on your phone with no data charges," 2012, [retrieved on Nov. 1, 2012] Retrieved from the Internet:<http://www.google.com.ph/intl/en/mobile/landing/freezone/stp.html> 2 pages.

(Continued)

*Primary Examiner* — Joseph E Avellino
*Assistant Examiner* — Binod J Kunwar
(74) *Attorney, Agent, or Firm* — Fish & Richardson P.C.

(57) ABSTRACT

A computer-implemented method includes obtaining a whitelist that identifies one or more content providers that are accessible for free through a particular network service provider, wherein the particular network service provider also provides access to the other content providers for which a fee is charged, a debit against an account is taken, or a subscription with the particular network service provider is required, establishing a particular network connection with the particular network service provider, identifying a network configuration that indicates whether to restrict communication with content providers by the computing device to only communication that is free, receiving a request to communicate with a particular content provider using the particular network connection, determining, based on the network configuration, whether the particular content provider is included in the whitelist for the particular network service provider, and blocking, based on the determining, the request to communicate with the particular content provider.

20 Claims, 5 Drawing Sheets

(56) References Cited

U.S. PATENT DOCUMENTS

| | | | | |
|---|---|---|---|---|
| 8,942,692 | B2* | 1/2015 | Randazzo | H04W 48/04 455/418 |
| 8,943,122 | B2* | 1/2015 | Leblanc | G06F 17/30905 709/203 |
| 9,253,617 | B2* | 2/2016 | Cohen | H04W 4/24 |
| 9,288,230 | B2* | 3/2016 | Ahmavaara | H04L 63/101 |
| 2003/0063750 | A1* | 4/2003 | Medvinsky et al. | 380/277 |
| 2005/0177506 | A1* | 8/2005 | Rissanen | G06Q 20/102 705/40 |
| 2007/0149168 | A1* | 6/2007 | Hariki | H04L 12/14 455/405 |
| 2009/0052359 | A1* | 2/2009 | Yerubandi | H04L 67/04 370/310 |
| 2009/0180777 | A1* | 7/2009 | Bernard | H04J 3/1694 398/68 |
| 2010/0056104 | A1* | 3/2010 | Butler | H04W 48/00 455/410 |
| 2012/0155380 | A1* | 6/2012 | Hodges | G06Q 30/00 370/328 |
| 2012/0254428 | A1* | 10/2012 | Isozaki | G06F 21/31 709/225 |
| 2012/0303811 | A1* | 11/2012 | Markwart et al. | 709/225 |
| 2013/0095785 | A1* | 4/2013 | Sadana | H04W 4/003 455/406 |
| 2013/0111024 | A1* | 5/2013 | Setia | H04L 67/02 709/225 |
| 2013/0130643 | A1* | 5/2013 | Bacareza | H04L 29/06537 455/406 |
| 2013/0145007 | A1* | 6/2013 | Randazzo | H04W 48/04 709/223 |
| 2013/0155380 | A1* | 6/2013 | Van Der Gaag | G03F 7/00 355/18 |
| 2013/0238473 | A1* | 9/2013 | Fan et al. | 705/34 |
| 2014/0079002 | A1* | 3/2014 | Chen | H04W 74/0833 370/329 |

OTHER PUBLICATIONS

Grundy, "How to Set Proxies for Opera Mini," *Demand Media*, 2012, 2 pages.

'Press Releases,' [online]. "Surfing USA: Mobileplay offers free mobile services with Opera Mini™ 2.0," 2006, [retrieved on Oct. 30, 2012]. Retrieved from the Internet:<www.opera.com/press/releases/2006/08/01/> 2 pages.

'CNet,' [online]. "Verizon V Cast," 2005, [retrieved on Mar. 12, 2013]. Retrieved from the Internet:<http://reviews.cnet.com/photo-video-services/verizon-v-cast/4505-9242_7-31299289.html> 3 pages.

'Lock Media,' [online] "Lock Media's WiFi Captive Portal / Payment Gateway Solution," 2010, [retrieved from 'Internet Archive, Wayback Machine,' on Oct. 30, 2012]. Retrieved from the Internet<http://www.lockmedia.com/solutions/captive-portal-gateway.asp 2 pages.

'The Facebook Blog,' [online] "Fast and Free Facebook Mobile Access with 0.facebook.com," 2010, [retrieved on Oct. 30, 2012]. Retrieved from the Internet:<www.facebook.com/blog/blog.php?post=391295167130> 1 pages.

* cited by examiner

MANAGING ACCESS TO NO-COST CONTENT

TECHNICAL FIELD

This document generally relates to managing access by computing devices, such as mobile computing devices, to free internet-based content.

BACKGROUND

Mobile computing devices, such as smartphones, cellular telephones, tablet computing devices, and personal digital assistants (PDAs), have been configured with mobile data plans (e.g., recurring monthly fee for use of a specified amount of data access over a mobile data network during the month) and with configuration tools to enable/restrict mobile data access. For example, mobile computing devices have been provided with network settings to toggle mobile data usage on and off, and to toggle roaming data usage on and off. For instance, when the mobile data usage is set to "off," a mobile computing device may not transmit or receive any network traffic over mobile data network connections.

SUMMARY

This document generally describes managing access on computing devices to content that is accessible at no-cost, or free, through one or more network service providers (e.g., mobile data network providers, WiFi network providers). For instance, network service providers may provide access to some content providers (e.g., websites, media streaming services, social network services, news services) for free while charging customers for access to other content providers. Computing devices can be configured to obtain whitelists that identify content service providers that are accessible through network service providers for free and to use such whitelists to operate the computing devices in one or more modes of operation whereby network traffic is restricted to traffic that is provided by the network service providers for free.

In a first aspect, a computer-implemented method includes obtaining, at a computing device, a whitelist that identifies one or more content providers that are accessible for free through a particular network service provider, wherein the particular network service provider also provides access to the other content providers for which a fee is charged, a debit against an account is taken, or a subscription with the particular network service provider is required, establishing, by the computing device, a particular network connection with the particular network service provider, identifying a network configuration that indicates whether to restrict communication with content providers by the computing device to only communication that is free, receiving a request to communicate with a particular content provider using the particular network connection, determining, by the computing device and based on the network configuration, whether the particular content provider is included in the whitelist for the particular network service provider, and blocking, by the computing device and based on the determining, the request to communicate with the particular content provider.

Implementations can include any, all, or none of the following features. The whitelist can include one or more entries that are selected from the group consisting of: an internet protocol (IP) address, a uniform resource locator (URL), and a regular expression. The whitelist for the particular network service provider can be different than one or more other whitelists for one or more other network service providers. Obtaining the whitelist can include receiving the whitelist from another computing device as part of a push service associated with the particular network service. Obtaining the whitelist can include receiving the whitelist by the computing device from another computing device as part of a pull service associated with the computing device. Obtaining the whitelist can include receiving the whitelist by the computing device from another computing device as part of a push service associated with the other computing device. The particular network service provider can be selected from the group consisting of: a mobile data network carrier and a wireless local area network provider. The particular network connection can include a wireless network connection. The computing device can include a mobile computing device. The method can further include providing, on a display of the computing device, a user interface that includes controls for designating, at least, the network configuration to indicate whether or not to restrict communication with content providers by the computing device to only communication that is free and receiving, through the user interface on the computing device, user input that specifies the network configuration. The method can further include providing, on the display of the computing device, a notification to a user of the computing device that the computing device is operating under the network configuration to restrict communication with content providers by the computing device to only communication that is free. The method can further include providing, on a display of the computing device, a message to a user of the computing device that the request to communicate with the particular content provider has been blocked. The method can further include receiving, from an application that is running on the computing device, a request for information indicating whether the computing device is operating in a free mode of operation in which communication with content providers by the computing device is restricted to only communication that is free and based on the identified network configuration, providing a response to the application.

In a second aspect, a computing device can include one or more processors, an antenna configured for wireless communication, a network configuration repository that stores one or more network configuration settings where at least one of the network configuration settings is directed to whether network communications are restricted to free data communications, a whitelist repository that stores one or more whitelists, each whitelist identifies one or more content providers that are accessible for free through a particular network service provider, a network communication manager that is programmed to receive one or more user selected preferences and store the user selected preferences in the network configuration repository, and a network interface that is programmed to restrict data communication by the computing device based on the one or more network configuration settings stored in the network configuration repository and the whitelists stored in the whitelist repository, wherein the particular network service provider also provides access to other content providers for which a fee is charged, or a debit against an account is taken and access to the content the content for which the fee is charged is blocked when the network configuration settings are configured by the network communication manager such that the computing device is operating in a free only mode.

Implementations can include any, all, or none of the following features. The device can further include a display device. The display device can be a touch-sensitive display device. The antenna can be configured for communication from the group consisting of: mobile data network communication and wireless local area network communication. The whitelist can include one or more entries that are selected from the group consisting of: an internet protocol (IP) address, a uniform resource locator (URL), and a regular expression. The whitelist for a particular network service provider can be different than other whitelists for other network service providers.

In a third aspect, a computer-implemented method includes requesting, by an application that is being executed by a computing device that has established a network connection with a network service provider, information that indicates whether the computing device is operating in a free mode of operation in which network communication with content providers by the computing device is restricted to only communication that is free, receiving, by the application, information that indicates that the computing device is currently restricting access to one or more content providers that are included on a whitelist that is associated with network service provider, wherein the network service provider provides free communication over the network connection with the one or more content providers and provides non-free communication over the network connection with other content providers that are not included in the whitelist, the non-free communication comprising communication for which a fee is charged, a debit against an account is taken, or a subscription with the particular network service provider is required, determining, by the application and based on the one or more content providers that are identified on the whitelist, whether to deactivate one or more features of the application while the computing device is using the network connection with the network service provider, and causing, by the application and based on the determining, a modified user interface for the application to be output on a display of the computing device.

Certain implementations can provide one or more advantages. For example, users can have greater control over network traffic for a computing device and, particularly, over network traffic that may incur a charge by the network service provider. In another example, users can better manage their mobile data plans, control network access by applications that may be running in the background, and be readily notified of what content is currently accessible for free through a network service provider and what content is not. In yet another example, creators of an application can dynamically enable or disable features of the application based on a detection of free access to an application program interface (API).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
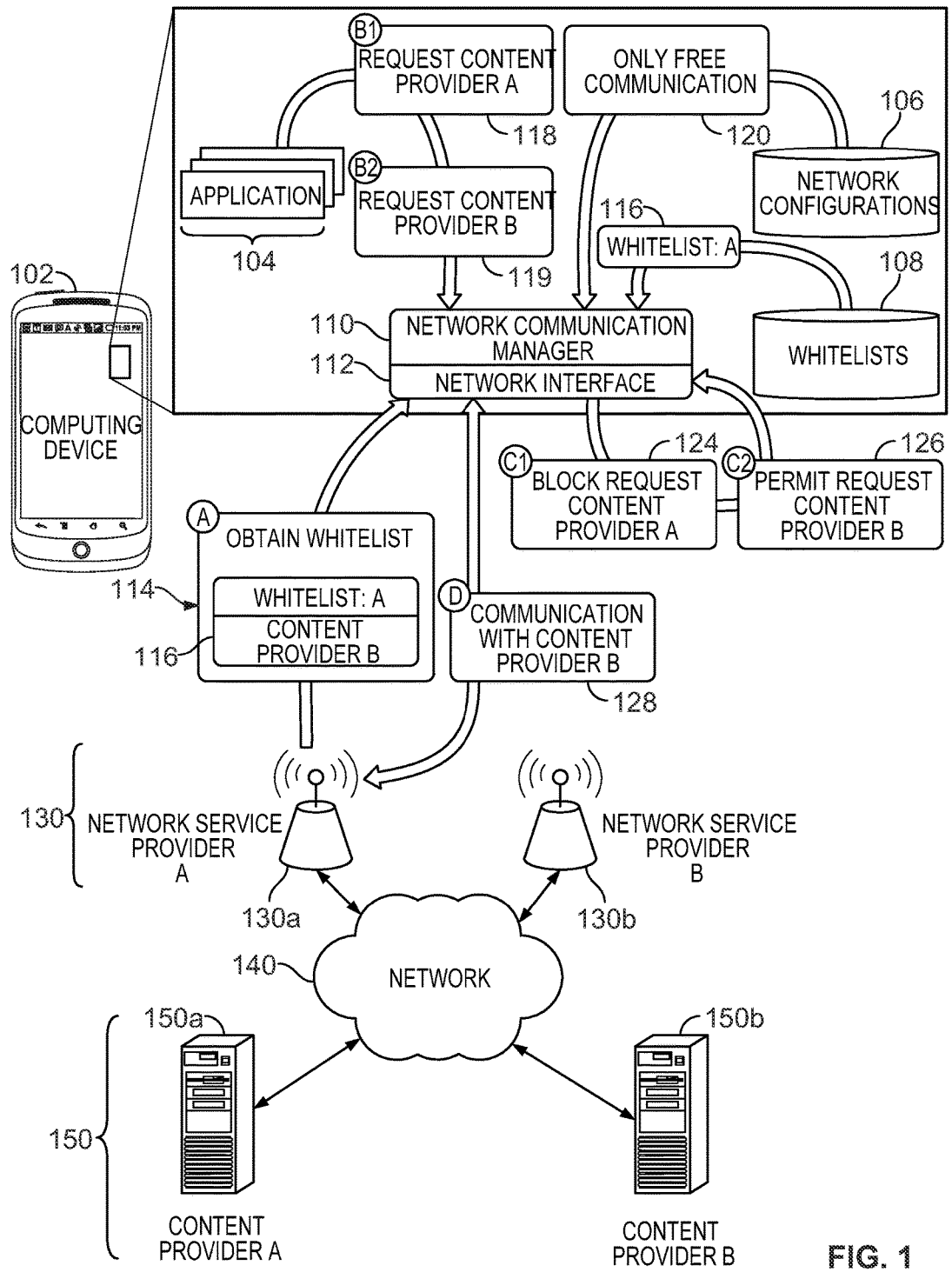
FIG. 1 shows a conceptual diagram of an example system that can be used to communicate with one or more content providers.

This document generally describes computing devices, such as mobile computing devices, and techniques for managing access by such computing devices to no-cost (free) content through network service providers. For example, a particular network service provider (e.g., mobile data network provider) may provide access to content from one or more internet domains (e.g., example-domain.com) for free (no-cost) and may charge a fee (e.g., amount of money, debit against an account, subscription requirement) to access content from other domains (e.g., other-domain.com). Discovery of which content is freely accessible for a particular network service provider may be difficult for users to track, for example, when users transition amongst different network service providers for network access as they travel between different locations with their mobile computing devices. For instance, it may be difficult for users of computing devices, such as mobile computing devices, to know what sites are accessible through a particular network service provider for free (at no-cost) and what sites are not. This document describes obtaining information that identifies content providers (e.g., website hosts, URLs, IP addresses) that are accessible for free through various network service provider, and using such information to notify users of content providers that are accessible for free (no-cost) and to restrict access to such content providers (e.g., data communication can be restricted such that a mobile device is only able to access one or more content providers (e.g., web sites) to which access is provided for free by a network service provider (e.g., a cell phone service provider such as AT&T, VERIZON, SPRINT, and the like)).

For example, consider a situation where a large number of users have limited data plans (e.g., plans for which a user is able to transmit a limited amount of data (e.g., 2 GB, 4 GB) for a fixed periodic rate before additional fees are charged) with a network service providers in a region. In such circumstances, users may attempt to limit their data usage through the network service providers, such as by not accessing content from various content providers through their data plan, so as to avoid overages and extra fees. However, to encourage users to continue to access content from their sites using their limited data plans, content providers (e.g., social network content providers, email providers, news providers) may negotiate with the different network services providers for access to the content providers' content to be provided to the users for free and, in some instances, for the content providers themselves pay the network service providers for the data costs associated with users accessing the content providers' content over the respective networks. This document describes techniques for distributing information to computing devices regarding which content services are accessible for free from various network services providers, techniques for notifying users when their computing devices are transitioning between accessing content that is free and not-free content, and techniques for allowing users to place their computing devices in a restricted mode whereby the computing device, and all of the applications and services that are running on the computing device, is only able to access content that is accessible for free through a network service provider to which the computing device is currently connected.

In another example, users may wish to have direct control over whether processes running in the background on a mobile computing device can access network-based content. For example, many mobile computing devices have one or more processes that are executed in the background of the operating system (e.g., a service that periodically checks for updates for software installed on the mobile device). Many of these services utilize networking resources without the user every being made aware that the mobile device is accessing the network (and consuming data bandwidth from the user's limited data plan).

To prevent a mobile computing device from inadvertently consuming the data bandwidth or otherwise causing the network service provider to charge the user for network access, the user can configure the mobile device to operate in a particular mode (e.g., "free mode") whereby the mobile device is restricted from accessing content providers that are not offered for free by the network service provider. For instance, the mobile device can receive data (e.g., one or more files or other pieces of configuration data) that identifies content that is being offered for free by a network service provider. The mobile computing device can also be configured to allow the user to select when the mobile device is operating in a free only mode (as opposed to a normal mode where the mobile computing device is allowed to access any content providers regardless of whether or not the content is accessible for free). As such, if the user enables the free only mode on a mobile computing device, then the mobile computing device can restrict its network activity through a network service provider to which the mobile computing device is connected to only communication with content services providers that the network service provider offers for free. In other words, the mobile device automatically blocks access to the fee-based content when the mobile device is operating in free only mode.

FIG. 1 shows a conceptual diagram of an example system 100 that can be used to communicate with one or more content providers. The system 100 includes a computing device 102, one or more network servicer providers 130, a network 140, and one or more content providers 150.

The computing device 102 can be any of a variety of appropriate computing devices that are able to access content provided by one or more content providers on a network. In the depicted example shown in FIG. 1, the computing device 102 is a mobile computing device, and more specifically, a smartphone. Other computing devices are also possible, such as desktop computers, laptop computers, tablet computing devices, netbooks, electronic book readers, portable media players, and/or personal digital assistants (PDAs).

As depicted in FIG. 1, the computing device 102 includes a plurality of applications 104. Some of these applications 104 can be foreground applications (e.g., applications that provide a user interface on the computing device 102 and that are configured to receive input from a user to provide one or more features). Foreground applications can include, but are not limited to, a web browser, a video game application, and a streaming media application (e.g., an application that streams movies and/or music to the computing device 102). Other applications from the plurality of applications 104 can be background applications, such as applications that process information without specific user direction and that provide various services to the computing device 102. One example of a background application is an auto-updater application that may automatically update aspects of the software executing on the computing device 102, including the operating system (not shown) and/or the applications 104.

In some implementations, the applications 104 can be used to obtain one or more user authentication tokens and/or provide free access to sign up for an account. For example, as described in more detail below, aspects of an application, such as a log-in or sign-up feature can be implemented in a free only mode while other aspects, such as video streaming may be in implemented requiring a fee-based connection.

The computing device 102 also includes a number of repositories for storing information. In the depicted example, the computing device 102 includes a network configurations repository 106 and a whitelist repository 108. While shown separately, the repositories may be stored in the same computer-readable storage medium. For example, the network configuration repository 106 and the whitelist repository 108 can be stored as one or more data files on a magnetic drive (e.g., a traditional hard drive) or a solid-state drive (e.g., a thumb or flash drive) according to particular implementations. As another example, the network configurations repository 106 and the whitelist repository 108 can be stored as records in a database on the computer device 102, according to particular implementation.

The network configurations repository 106 can include one or more user-configurable settings that can be used to control the manner in which the computing device 102 communicates over a network (e.g., network 140), with a network service provider (e.g., network service providers 130), or a content provider (e.g., content providers 150). For example, as described in more detail below, the network configurations repository 106 can include a setting that defines whether the computing device 102 can be used in a roaming mode of operation, whether the computing device 102 can be use mobile data, and whether the computing device 102 can restrict the mobile data to free data only, to name a few examples.

The whitelist repository 108 can include one or more whitelists (e.g., lists of information/entities that are pre-approved for a particular privilege, service, and/or access). A whitelist can include one or more content providers to which a particular network service provider offers access without charging a fee, taking a debit against an account, and/or requiring a subscription with the particular network service provider. That is, a particular whitelist from the whitelist repository 108 can identify the free content that the computing device 102 can access using a particular network service provider. Entries in a whitelist stored in the whitelist repository 108 can include a variety of information and details. For instance, entries in a whitelist can be an internet protocol (IP) address (or a block of IP addresses), a uniform resource locator (URL), a URL matching rule (e.g., a URL, a URL prefix, or a regular expression), or combinations thereof. In some implementations, URL matching rules may not be applied to certain types of connections, like secure HTTP connections.

For example, a content provider that has an IP address of 192.168.305.127 can be listed in a whitelist stored in the whitelist repository 108. The computing device 102 can use this information to determine whether to allow or deny a request for network access (e.g., a network socket request) to obtain content from a content service provider. Similarly, a combination of an IP address and a regular expression for a content provider, such as 192.168.305.[0-9+], can be used to identify a range of IP addresses and therefore a range of servers or content offered by a content service provider. Additionally, the whitelist may include human-recognizable identifiers that are converted to IP addresses by a domain name server (DNS) when attempting to access particular content. For example, the whitelist may include a uniform resource locator (URL) or other plain text identifier, such as "this.videogame.contentprovider.net," which can be used to identify one or more content service providers and/or specific content offered by content service providers. Such URLs can be used to access content providers, such as through conversion of the URL to an IP address (e.g., 192.168.305.127).

In another example, the example URL http://www.contentprovider.net/videogame can be stored as part of a whitelist and converted into the IP address 192.168.305.999 when attempting to access content from a corresponding content service provider. Other combinations of numeric IP addresses, regular expressions, and/or human-recognizable identifiers are also possible. In some implementations, the IP addresses corresponding to one or more DNS servers may also be included in the whitelists so that performing a DNS lookup is performed for free.

The computing device 102 also includes a network communication manager 110 that can manage requests to communicate over network connections and can determine whether to permit particular requests based on a variety of appropriate information, such as current network configurations (e.g., free only mode of operation), whitelists for one or more current network connections, and a resource identifier (e.g., URL) for a network request. The network communication manager 110 can communicate with both repositories 106 and 108 to store and retrieve network configuration settings and whitelists in the respective repositories 106 and 108. The network communication manager 110 may also provide a graphical user interface (GUI) by which a user of the computing device can select one or more network configurations that are stored in the network configuration repository 106. An example of a graphical user interface presented by the network communication manager 110 is described with reference to FIG. 3A.

The computing device 102 also includes a network interface 112. The network interface 112 can be any of a variety of appropriate interfaces through which the computing device 102 can communicate with the network service providers 130. For example, the network interface 112 can be a combination of software, firmware, and hardware (e.g., one or more layers in the ISO 7-layer network stack) including, but not limited to, a cellular radio antenna and one or more software or firmware components that can be used to manage communications utilizing the cellular radio antenna. The network communication manager 110 can also filter requests before initiating communication with the network service providers 130. For example, if the network communication manager 110 determines that fee-based content is being requested when the computing device 102 is operating in a free only mode (as specified by one or more network configuration settings stored in the network configuration repository 106 and the whitelists stored in the whitelist repository 108), the network interface 112 may prevent the request from being transmitted over the cellular radio antenna and thus preventing network communication for the fee-based content. In other words, the network communication manager 110 can be programmed to restrict data communication through the network interface 112 by the computing device 102 based on the one or more network configuration settings stored in the network configuration repository 106 and the whitelists stored in the whitelist repository 108.

Network service providers 130 can include any number of network service providers. In the example system 100 depicted in FIG. 1, there are only two network service providers 130a and 130b shown, but additional network service providers 130 are also possible. The network service providers can be any of a variety of network service providers, such as mobile data network providers (e.g., 4G mobile data network provider), cellular telephone network providers, short and/or medium range wireless network providers (e.g., WiFi network, BLUETOOTH network), and/or other network providers that may charge fees or require subscriptions for network access.

Network 140 can include one or more communication networks that allows for electronic communication between at least two computing devices. Examples include the Internet, a local area network (LAN), a wide area network (WAN), a virtual private network (VPN), a wireless network (e.g., WiFi, cellular telephone network, 3G/4G data network, etc.), or any combination thereof.

The computing device 102 can communicate over the network 140 and through connections with one or more of the network service providers 130 to obtain content (e.g., text, images, web pages, streaming content) from one or more of the content providers 150, as permitted by the network communication manager 110 according to the current network configurations and whitelists for the network service providers 130. The content providers 150 can include any of a variety of computer systems and/or computing devices that communicate content over the network 140. For example, the content providers 150 can be computer systems hosting web sites and that serve content (e.g., web pages and associated information) associated with the web sites, such as news web sites, social networking web sites, banking web sites, and/or other web sites. In another example, the content providers 150 can distribute content to applications, such as email applications, messaging applications, social networking applications, and/or external storage applications, that are running on the mobile device 102. In the example system 100 depicted in FIG. 1, two content providers 150a and 150b are presented, but additional content providers 150 are also possible. For example, content provider 150a can be a game server that provides game-related content to a game application that is running on the mobile device 102. Likewise, content provider 150b can be a computer system that hosts a social networking web site or other website.

In some implementations, the content provided by the content providers 150 may be subscription-based (e.g., a subscription-based game or a subscription-based streaming media service), transaction-based (e.g., a pay-to-play game or a pay-to-download service), and/or may be for free, without considering additional fees, charges, or subscriptions levied by the network service providers 130. For example, many web sites on the Internet are considered "free" (using the term colloquially) based on the web sites not charging a specific monetary amount for accessing the web site. Yet even the content that is accessible through these web sites may not be considered "free" (no cost) in the context described in this document based on fees and/or subscriptions that may be charged by the network service providers 130 to access such content through the service provided by the network service providers 130. For instance, the network service provider 130 may charge the user of the mobile device 102 a service charge, a fee, and/or an amount corresponding to the network data usage against the user's network usage plan (e.g., a mobile data plan) to access content from some content providers but not others, such as content providers who are identified on whitelists for the network service providers 130. In other words, the subject matter described in this document is generally related to provided connections that are "data charge free."

By way of example, a technique is described in the context for FIG. 1 for communicating with one or more content providers. In the described example, when the computing device 102 communicates with the network service providers 130 the computing device 102 does so through the network interface 112. Also, in the described example, the computing device 102 has been configured to currently operate in free only mode. That is, the computing device 102 has been configured to operate in a mode in which communication with the content providers 150 by the computing device through the network service providers 130 is restricted to only communication that is free and without an associated cost that is charged by the network service providers 130.

In step A (114) the computing device 102 obtains one or more whitelists 116 for the network service provider A (130a). In the depicted example, whitelist 116 specifies that the whitelist 116 pertains to the networks service provider A for which the whitelist is relevant. For instance, the example whitelist 116 includes an identifier "whitelist: A" that indicates that this whitelist is for the network service provider A 130a. In addition to a network service provider identifier, the whitelist 116 also identifies content providers to which access is being provided for free by the network service provider A (130a). For example, whitelist 116 includes an identifier "content provider B" to indicate that access to the content provider B 150b is provided for free (no cost) through network service provider A 130a.

The whitelists can be obtained in a number of ways, including using both push and pull models. The computing device 102 may obtain whitelists for the network service providers 130 directly from the network service providers 130 and/or from other computing devices (e.g., whitelist distribution service). The whitelists can be obtained and/or updated periodically and/or on-demand from the computing device 102. The manner in which whitelists can be obtained is described in more detail below. The obtained whitelists can be stored in the whitelist repository 108 by the computing device 102.

In step B1 (118), one of the applications 104 provides an example request for content from content provider A (150a) and in step B2 (119) one of the applications 104 (can be the same or different application that requested content from content provider A) provides a request for content from content provider B (150b). In response to the request, the network communication manager 110 can retrieve the network configuration 120 from the network configuration repository 106 that, in this example, indicates that the computing device is currently operating in a free only mode. Likewise, the network communication manager 110 can retrieve the "whitelist: A" 116 from the whitelists repository 108 based on the computing device 102 currently using a connection with network service provider 130a to communicate over the network 140.

In step C1 (124), based on the computing device 102 is operating in free only mode and based on the content being requested is from content provider A 150a (that is not in the whitelist for the network service provider A 130a), the network communication manager 110 blocks the request for content provider A. The manner in which the content is blocked depends on particular implementations. For instance, the network communication manager 110 may not create a network socket for the request to communicate with content provider A and can provide notification to the user and/or to the requesting application that the request has been blocked. For example, an error message can be displayed on the computing device 102 that indicates that communication with content provider A could not be completed based on the computing device 102 currently operating in a free only mode and the content provider A (150a) not being included on the whitelist for the network service provider A (130a). In another example, an application that provided the request for access to content from content provider A (150a) can be notified that the request has been block and the application can modify the features that are provided by the application making the request for content. For instance, portions of the application can be restricted or replaced so that the application does not utilize the fee-based content. Examples of the different blocking mechanisms are described in more detail below.

In step C2 (126), based on the computing device 102 operating in free only mode and based on content being requested from content provider B 150a (which is in the whitelist for the network service provider A 130a), the network communication manager 110 can permit the request for content from content provider B. For instance, the network communication manager 110 can create a network socket for the request to communication with content provider B and can proceed to communicate with content provider B through the network interface 112 and the network service provider A (130a), as indicated by step D (128).

In some implementations, the computing device 102 may optionally include a display device. An example of a computing device that does not include a display device that can be used as a computing device 102 is a mobile hotspot device. That is, there is generally not a display on a mobile hotspot device. To configure such a device, a data connection can be established between the computing device 102 and a second, other, computing device. Then, configuration information can be provided from the second computing device to the computing device 102. For example, a user of the second computing device can be presented with a user interface and the user can provide configuration information using the user interface. The configuration information can be transmitted to the computing device 102 using the data connection.

Figure 2:
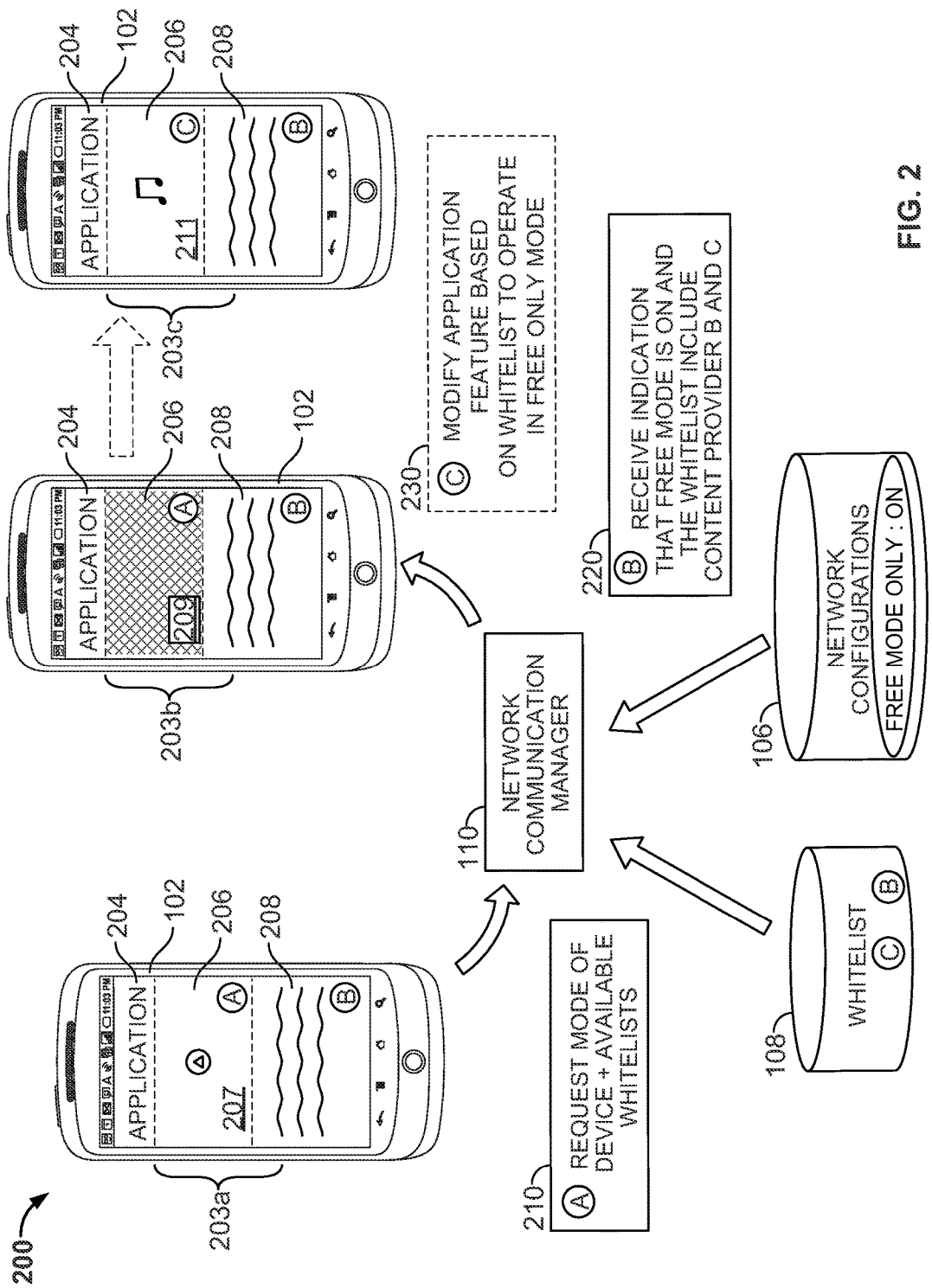
FIG. 2 shows a conceptual diagram of an example technique that can be used to modify the functionality of an application in communication with a content servicer provider.

FIG. 2 shows a conceptual diagram of an example technique 200 to modify the features of an application based on the current mode of communication for a computing device. For example, there may be scenarios when one or more features of an application incur a usage fee or surcharge when other features do not. For instance, an application may include features that use information from different external content providers, such as a first feature that accesses news information from an external news content provider and a second feature that accesses weather information from a different external weather content provider. When the computing device 102 is operating in a free-only mode, one or more of the features of an application may not be usable based on whether one or more content service providers that are used for the one or more features are included in a whitelist for the network service provider that is currently being used by the computing device. Instead of presenting features that would incur a cost or that would not be usable for free, the execution of the application and the presentation of a corresponding user interface can be modified to prevent the execution and presentation of those features that would incur a usage fee or surcharge by accessing content outside of a whitelist for the current network service provider that is being used by the computing device.

In the depicted example, the computing device 102 presents a user interface 203a-203c of an application 204. Application 204 can be one of the plurality of applications 104 and, for example, can be used to provide content from one or more content providers. In the example shown, application 204 presents content from more than one content service provider (e.g., content servicer provider A 150a and content service provider B 150b). For example, the application 204 can be a news application that includes video snippets of news stories from a first content service provider, and a Really Simple Syndication (RSS) news feed of news stories from a second content service provider. The application 204 includes a first region 206 and a second region 208. For example, the first region 206 can present content from content service provider A 150a and the second region 208 can present content from content service provider B 150b.

In some implementations, the features that are provided for the application 204 can change based on a combination of whether the computer device 102 is configured to operate in free-only mode and/or whether the application 204 is communicating with a content service provider included in a whitelist. For example, application 204 may launch with a user interface corresponding to user interface 203a. As shown in user interface 203a, the first region 206 presents a video streaming feature 207. Video can be very bandwidth intensive and many network service providers may wish to limit or otherwise restrict the amount of streaming video that is performed by the computer device 102. For example, the network service provider 130a may charge a user of the computing device 102 a surcharge or other fee for accessing streaming video or may charge a user a surcharge or other fee if the amount of streaming video exceeds some threshold amount over a particular period of time. As such, a user of the computing device 102 may want to disable or otherwise prevent the application 204 from presenting streaming video while still presenting the news feed in the second region 208.

For example, in step 210, the application 204 can request information that identifies a current mode of operation for the computing device 102 (e.g., whether or not the computing device 102 is operating in free-only mode) and the available whitelists for a particular network service provider (e.g., those whitelists stored in the whitelist repository 108). The application 204 can access the mode of the computing device 102, for example, by using an application program interface (API) call that sends a request to the operating system of the computing device 102. In response, the computing device 102 can access the network communication manager 110, which can access the network configuration repository 106 and the whitelist repository 108 to provide information regarding the mode in which the computing device 102 is currently operating.

For example, in step 220, the application 204 receives an indication that the free only mode is currently being used by the computing device 102 and that the whitelist repository that specifies content service providers B and C. In other words, only content providers B and C are available for free through the network service provider that the computing device 102 is currently being used. But user interface 203a includes content provided by content provider A, which is not available for free. As such, the application 204 may disable the first region 206, as depicted in the user interface 203b. For example, the first region 206 of the user interface 203b can include a greyed-out or blank region 209 to indicate to a user that certain elements of the application 204 are not currently available. In some implementations, the greyed-out or blank region 209 may also include a status indicator or message that indicates that a portion of the application was blocked because the computing device 102 is operating in a mode in which communication with content providers by the computing device is restricted to only communication that is free. A few examples of different status notifications are shown in reference to FIGS. 3B-3C.

Optionally, instead of disabling one or more elements, in step 230, the application may modify one or more application features based on the whitelist and whether the computing device 102 is operating in the free-only mode of operation. For example, in user interface 203c, the first region 206 can be modified to include a streaming audio feature 211 that accesses content provided by content provider C, which is one of the content providers in the whitelists 108. This streaming audio feature 211 may provide news snippets similar coverage to that of streaming video feature 207. So, in this example, instead of viewing short video clips of news stories and paying a fee, the user instead can listen to short audio clips of those same news stories for free. In this way, the application 204 can provide substantially similar content to users of the application 204 while respecting the user's preferences regarding free-only operation.

Figure 3:
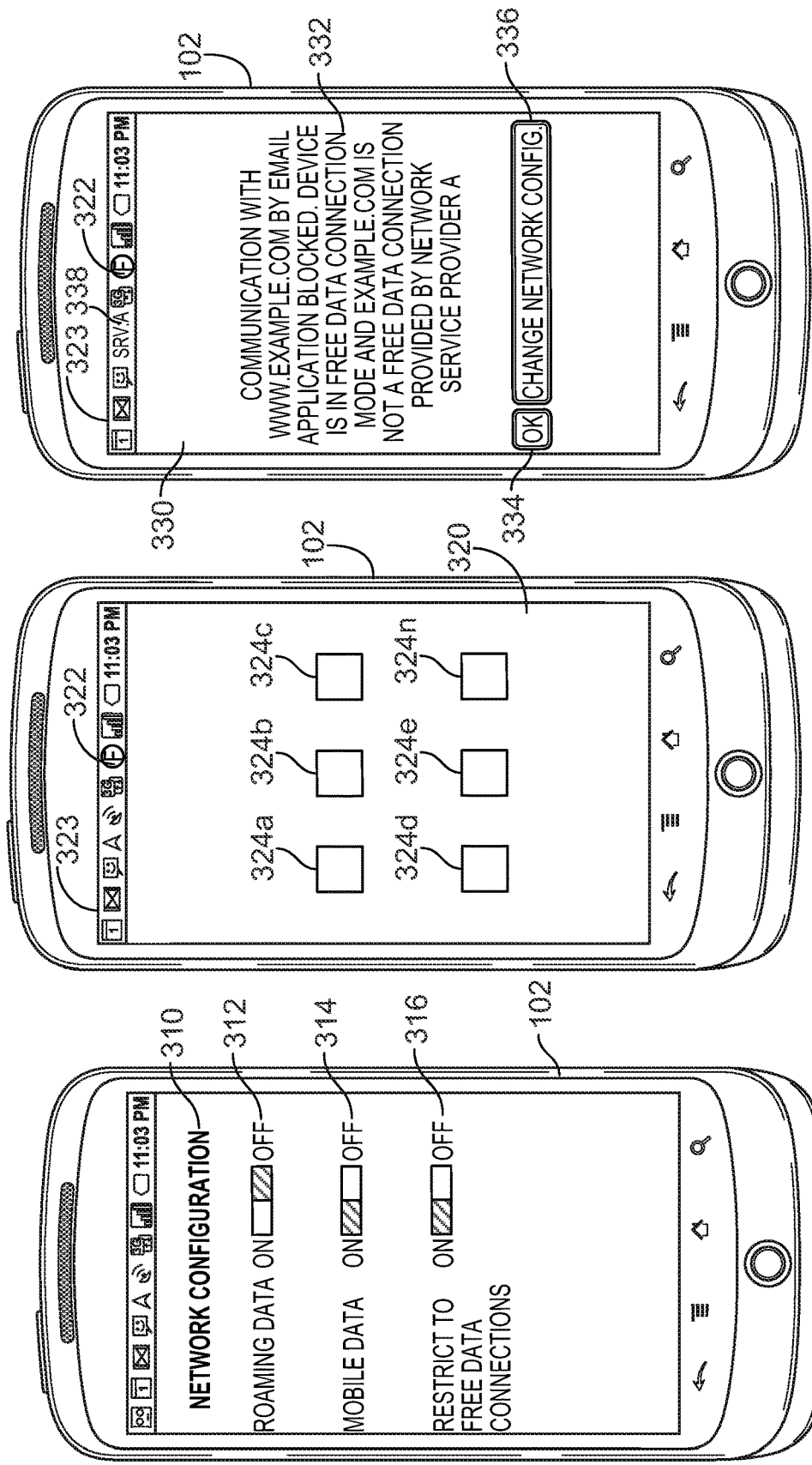
FIG. 3A-3C show diagrams of example user interfaces for receiving and presenting information to a user.

FIG. 3A-3C shows diagrams of example user interfaces for receiving and presenting information to a user. These user interfaces 310, 320, and 330 can be presented on any of a variety of display and input devices, such as a touch-sensitive display device on the computing device 102, a display screen with one or more keyboards/keypads on the computing device 102, and/or a display screen with a microphone and speech to text transcription module on the computing device 102 to transcribe audible commands. Referring to FIG. 3A, a user interface 310 is shown that can be used to configure various aspects of the communication parameters of the computing device 102. For example, the user interface 310 provides user-interface components 312, 314, and 316 that allows the user to select a configuration preference for the operation of their mobile device 102.

For example, user-interface component 312 (e.g., selectable on/off switch) allows a user of the computing device 102 to select a preference regarding the use of roaming data. Roaming data rates for cellular activity may apply when a user leaves the primary service area of their respective service provider (e.g., as defined by a geographic area) but nevertheless has access to a service through another provider. Roaming data rates for cellular activity can be expensive, and so a user may prefer to turn roaming data off to prevent incurring the added expenses associated with sending and receiving mobile data (e.g., data sent or received using an antenna configured for cellular communication) while the computing device 102 is in a roaming mode of operation. For example, if the user-interface component 312 is placed in the "off" position (e.g., placing a finger on the touch-sensitive display device and swiping the finger in the corresponding direction), the computing device 102 (and applications executing thereon) can be prevented from sending and/or receiving mobile data when the computing device 102 is in a roaming mode of operation.

As another example, user-interface component 314 allows a user of the mobile device 102 to select a preference regarding the use of mobile data generally, regardless of whether the mobile data is roaming data or non-roaming data. Some service plans offer a limited amount of mobile data per billing cycle. A user may wish to disable sending and/or receiving any mobile data to prevent the computing device 102 from inadvertently exhausting the amount of mobile data afforded the user during a particular billing cycle. For example, if the user-interface component 314 is placed in the "off" position (e.g., placing a finger on the touch-sensitive display device and swiping the finger in the corresponding direction), the computing device 102 (and applications executing thereon) can be prevented from sending or receiving any mobile data.

As yet another example, user-interface component 316 allows a user of the computing device 102 to select a preference regarding whether to restrict the mobile data to free data connections (e.g. free only mode). As described above, there are situations where a user may want to limit the capabilities of the computing device 102 such that computing device 102 is placed in a mode of operation in which network communication with content providers by the computing device 102 is restricted to only communication that is free. For example, if the user-interface component 316 is placed in the "on" position (e.g., placing a finger on the touch-sensitive display device and swiping the finger in the corresponding direction), the computing device 102 (and applications executing thereon) can be prevented from accessing content providers that do not provide their content for free.

User-interface components 312, 314, and 316 can be any user selectable user-interface component. For example, the user-interface components 312, 314, and 316 can be toggles, sliders, check boxes, or other selectable user-interface components. These user-interface components can be selected by a user using the touch-sensitive display of the computing device 102 to manipulate the user-interface components accordingly.

Configuration parameters corresponding to the user-interface components 312, 314, and 316 can be stored, for example, in the network configuration repository 106. For example, by selecting "on" for user-interface component 316, the user specifies a corresponding configuration parameter that the network communication manager 110 can store as a value in the network configuration repository 106. This configuration parameter can be referenced or otherwise retrieved during execution of other techniques described in this document. In some implementations, other network configurations can be also be included and modified in the user interface 310 including setting a mobile data limit, restricting all background data, restricting background data per application, and turning auto-sync data on/off. Such implementations may have a corresponding user-interface component that is selectable and allows the user to choose particular preferences for these and other network configurations.

Referring now to FIG. 3B, a home screen 310 is shown that includes a status area and a number of icons 324a-324n. The status area 323 includes a status indicator 322. This status indicator 322 can be used by the computing device 102 to show the user when the computing device 102 is operating in free-only mode and/or when the computing device 102 is not operating in free-only mode. For example, the status indicator 322 can be an "F" to show that the computing device is operating in free-only mode. In some implementations, when the computing device is not operating in free-only mode, the "F" indicator 322 can be modified (e.g., the "F" can be shown crossed out) or can be removed from the status area 323 to indicate that the computing device 102 is not operating in free-only mode.

The icons 324a-324n may correspond to a number of different applications (e.g., applications 104) stored on the computing device 102. When a user selects one of the icons (e.g., pressing the touch-sensitive display device substantially on one of the respective icons 324a-324n), the computing device 102 can execute the application and present the application the user. Alternatively, if the application is already executing in the background (e.g., because it was previously selected and later minimized), selecting one of the icons 324a-324n can cause the selected application to be launched and for a user interface for the application to be presented the user. The mode of operation indicated by the indicator 322 may prevent some applications from executing because, for example, doing so would require the application communicate with a content provider that is not free when the user has previously requested that only free communications be allowed. In such circumstances, one or more messages or other visual cues can be generated to illustrate to that execution of the application has been blocked, such as the message described below with regard to FIG. 3C.

Referring now to FIG. 3C, a user interface 330 including a message 332 is shown that can be provided to the user. Again, the user interface includes a status area 323 and a status icon 322. In addition, however, is another status indicator 338 which specifies the network service provider in which the computing device is using for mobile data communication. This can be used in conjunction with the status indicator 322 to help the user ensure that the computing device 102 is operating in a manner consistent with the user's preferences. For example, the user can quickly ascertain from the status area 323 that the free-only mode pertains to the network service provider A. The user can use that information when communicating with network service provider A if the behavior of the computing device 102 is not consistent with the user's expectations or selected preferences.

The message 332 can inform the user of the computing device 102 that the request to communicate with the particular content provider has been blocked. For example, if the user selects icon 324a that corresponds to an e-mail application provided by content provider with a URL of www.example.com, the message 332 can inform the user that the device is in free-only mode and that communication initiated by the e-mail application has been blocked. The message 332 can also optionally a selectable "ok" button 334 and a selectable "change network config" Button 336.

When the user selects the "ok" button 334, the message 332 can be removed or otherwise minimized so the user can proceed interacting with the computing device 102. For example, when the user selects the "ok" button 334, the message 332 can be removed and a user interface substantially similar to user interface 320 shown in FIG. 3B can be shown to the user. The user can then select another one of icons 324a-324n as appropriate.

When the user selects the "change network config" button 336, the message 332 may also be removed, but instead of presenting the user with a user interface substantially similar to user interface 320, the computing device 102 can present the network configurations. For example, the computing device 102 can present a user interface substantially similar to user interface 310 shown in FIG. 3A. Once the user interface 310 is presented, the user has the option of changing one or more network configurations. This can allow the user to change the mode of operation such that when the execution application that generated the message 332 is attempted again, a change in the network configurations can allow the application to properly execute. For example, if the user turns "off" the restricting the mobile data to free communications using user-interface component 316, and then selects icon 324*a* corresponding to the e-mail application, the e-mail application can communicate with content provider www.example.com and present the appropriate content. Note, however, that by executing the e-mail application in this manner, the user will likely incur some costs levied by the network service provider A because the particular content provider does not provide its content for free.

Figure 4:
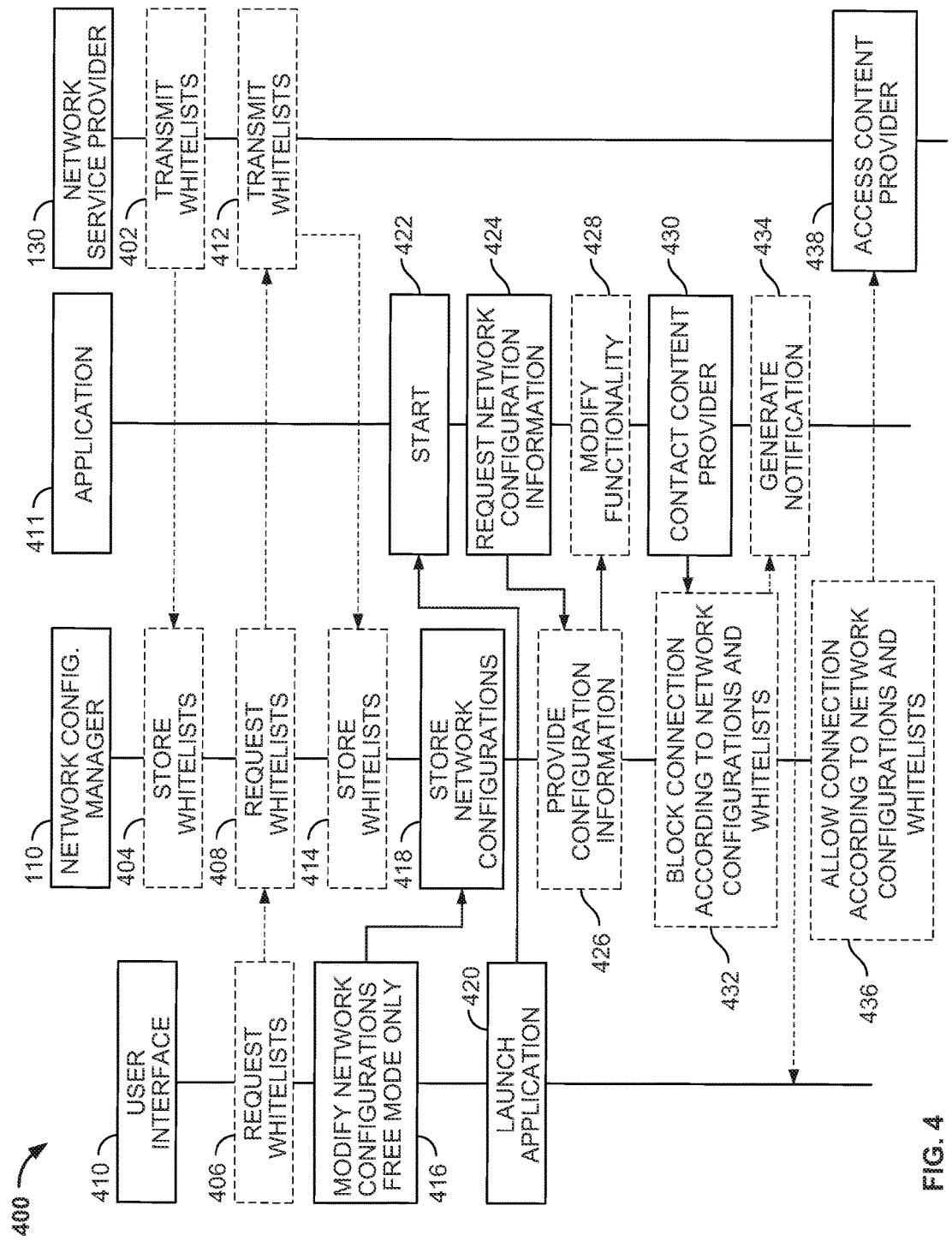
FIG. 4 shows an example swimlane diagram illustrating a technique for communicating with one or more content providers.

FIG. 4 shows an example swimlane diagram illustrating a technique 400 for communicating with one or more content providers. The technique 400 can be performed as needed to facilitate communication with content providers and block communications with particular content providers when the computing device 102 is operating in a free-only mode. Portions of the technique 400 are depicted as being performed by one or more user interfaces 410 provided on the computing device 102, the network communication manager 110 of the computing device 102, one or more applications 411 of the computing device 102, and a network service provider 130.

The user interface 410 can provide output to notify a user of events related to free and non-free content for a particular network service provider to which the computing device is currently connected. For example, the user interface 410 can output indicators (e.g., visual, auditory, tactile) that identify various actions that are performed by the computing device (e.g., during "free mode" operation of the mobile computing device blocking a request to access content from a website that is not provided for free) in association with the computing device operating in free mode. In another example, the user interface 410 can notify a user when the device transitions between accessing free content and non-free content through the particular network service provider, such as when a user navigates in a web browser application from a freely accessible site (e.g., www.free.com) to another website (e.g., www.notfree.com) that is not freely accessible through the particular network service provider. Other capabilities of the user interface 410 are describe in more detail below.

In step 402, the network service provider 130 can optionally transmit whitelists to the computing device 102. The network service provider 130 can optionally transmit the whitelists using over either a mobile or wireless data connection. In addition, the networks service provider 130 can transmit the whitelists under different circumstances. For example, whitelists can be transmitted to the computing device 102 as part of an operating system upgrade. As another example, the whitelists can be transmitted by the network service provider to the computing device 102 when new entries are added to the whitelist. Such transmissions are traditionally known as a push data model because the data (in this case the whitelist) are "pushed" from the network service provider to the computing device 102. This is contrasted with a pull data model described in reference to step 406 where the whitelists are "pulled" from the network service provide 150 to the computer device 102.

In step 404, the network communication manager 110 can store the whitelists. For example, the network communication manager 110 can store the whitelists in the whitelist repository 108.

In step 406, a user interface 410 can optionally be presented that provides controls through which a user can be explicitly request one or more whitelists from the network service provider 130. For example, a button or other user selectable component can be presented in a system tray or other system configuration user interface that when selecting using the touch-sensitive display device causes the computer device 102 to generate a request for one or more whitelists. Such an operation is traditionally known as a pull data model because the data (in this case the whitelists) are "pulled" from the network service provider 130 to the computer device 102. In another example, the network communication manager 110 can determine that an implicit request for whitelist information has been provided when the computing device 102 establishes a connection with a network service provider 130 (with or without explicit user direction) while the computing device 102 is operating in a free only mode of operation, and/or when the computing device 102 is switched to a free only mode of operation while connected to a network service provider 130. In such instances, the network communication manager 110 can cause a whitelist and/or an update to the whitelist to be obtained for the network service provider 130 to which the computing device 102 is connected or establishing a connection. This is contrasted with the push data model described in reference to step 402 where the whitelists can be "pushed" from the network service provider to the computer device 102. In some implementations, a first collection of whitelists may be pre-loaded on the computing device 102, for example, at a manufacturing plant in accordance with an agreement with the network service provider and can be updated accordingly (e.g., using either a "push" model and/or a "pull" model).

In step 408, the network configuration manger 110 can optionally request one or more whitelists from the network servicer provider 130. In response, in step 412, the network service provider 130 can optionally transmit the whitelists to the computing device 102. Such a transmission can occur, for example, using either a mobile data or wireless data connection.

In step 414, the networking configuration manager 110 can optionally store the received whitelists. For example, the network communication manager 110 can store the whitelists in the whitelist repository 108.

In step 416, the user interface 410 can provides controls through which a user can configure network settings on the mobile computing device. For instance, the user interface 410 can provide a control for toggling "free mode" for the device "on" and "off." Input received through these controls can be used by the computing device to adjust current network settings for the device. For example, in reference to FIG. 3A, user interface 310 can be presented that allows the user to modify the network configuration (e.g., either "on" or "off") corresponding to whether the computing device should restrict communication to content providers that are accessible for free over a current network service provider that the computing device 102 is currently using.

In step 418, the network communication manager 110 can store the network configurations. For example, if the user in step 416 places the user-interface component 316 into the "on" position, a value (e.g., "on", 1, "true", or some other value) can be stored in the network configuration repository 106.

In step 420, the user interface 410 can provide controls through which a user launches an application. For example, in reference to FIG. 3B, user interface 320 can be presented with icons 324*a*-324*n* corresponding to a number of different applications. The user can use the touch-sensitive display device to select an application by pressing on the displaying device at a position substantially near the respective icon.

In step 422, the application 411 can start. For example, an application can start when the computing device 102 executes the application code of the particular application. This application code can be stored, e.g., on a computer-readable storage device (e.g., a flash drive or hard drive) coupled with the computing device 102. A portion of the application may be executed by a remote computing system (e.g., content provider) and rendered by the application 411, such as through the use of a "thin client." Additionally, the application 411 can be any of a variety of applications, including background and system applications that are running as part of the operating system of the computing device 102 and without explicit user direction. For instance, the application 411 may be a background application that seeks to identify updates for the operating system and/or other applications for the computing device 102.

In step 424, the application 411 requests network configuration information, such as information that identifies a current mode of operation for the computing device 102 (e.g., free only mode) and whitelists for one or more current network service providers that are being used by the computing device 102 for network connectivity. For example, the request can be generated when the application 411 starts. As another example, this request can be made at a later time (e.g., in response to a user performing some activity within the application 411). The application 411 can generate the request by using an API call that allows the application 411 to send a request to the network communication manager 110.

In step 426, the network communication manager 110 provides configuration information to the application 411. For example, the network communication manager 110 can access the network configuration repository 110 and retrieve various values corresponding to one or more different network configuration parameters including whether or not the computing device 102 is configured to restrict connections to free data connections only. In some implementations, the configuration information also includes one or more whitelists from the whitelist repository 108.

In step 428, the application 411 can optionally modify the features of the application that are currently presented to the user according to the receive network configuration information. For example, the application 411 can determine whether the computing device 102 is operating in a free-only mode of operation (as specified by the network configuration information). Then the application can analyze the different features it offers and the content providers associated with those features. Then, the application 411 can modify its functionality to remove features that make use of content provided by content providers not included in the whitelist. For example, in reference to FIG. 2, the 411 application can present a greyed-out or removed portion 209 of the application user interface 203b. As another example, the application 411 can replace the functionality of the video streaming feature 207 with the audio streaming feature 211 based on the audio streaming feature 211 using content provided by a content provider present in the whitelist.

In step 430, the application 411 can attempt to contact a content provider by generating a communication request. For example, the application 411 may generate a communication request in response to being started by the user (e.g., to determine the availability of one or more game servers for a game application). As another example, a communication request can be generated by the application 411 in response to some activity performed by the user when using the application 411 (e.g., when the user using a browser application provides a URL www.notfree.com maintained by a particular content provider). Such requests generally relate to providing some form of content provided by the content provider. Requests can also be generated, however, that relate to some internal management of the application, including communication with the content provider to check whether updates are available for the application 411. In some implementations, the communication request may include HTTP requests, HTTPS requests, or combinations thereof.

In step 432, the network communication manager 110 can determine whether to block a connection to the content provider based on the network configuration settings and the whitelist entries. For example, in reference to FIG. 2, while the computing device 102 is operating in a free-only mode of operation, a communication request requesting content from content provider A can be blocked because content provider A does not appear as an entry in the whitelist stored in the white list repository 108. If the computing device 102 is operating without restriction, however, the network communication manager 110 can allow a communication request requesting content from any of content providers A, B, or C.

Depending on the type of communication request, the whitelist entries can be used in different ways to determine whether the network communication manager 110 should block a communication request. For example, an HTTP request included in the communication request generated in step 432 can be compared to the whitelist entries including an IP address, a block of IP addresses, or one or more URL matching rules including a URL, a URL prefix, or a regular expression.

As another example, an HTTPS request included in the communication request generated in step 432 can be compared to the white list entries including an IP address and a block of IP addresses. In some implementations, the URL matching rules may not be compared to HTTPS requests, because generally a URL request can not be viewed under a secure connection.

In step 434, the application 411 can generate a notification that the request has been blocked and provide send the notification for presentation in a user interface 410. The application can generate the content of the notification, and the user interface 410 can visually represent the generated message and provide controls through which a user interacts with the presented notification. For example, in reference to FIG. 3C, the user interface 330 includes a message 332. The content of the message 332 can be generated by the application 411 and the controls 334 and 336 for interacting with the message can be provided.

In step 436, the network communication manager 110 can optionally allow the connection to the content provider according to configuration settings and whitelist entries. For example, in reference to FIG. 2, a communication request requesting content from either of content providers B or C can be allowed because both content providers B and C appear as an entry in the whitelist stored in the white list repository 108. Furthermore, if the computing device 102 is operating without restriction, the network communication manager 110 can also allow a communication request requesting content from any of content providers A, B, or C.

In step 438, the network service provider 130 can receive a communication request and access the content provider. For example, the network service provider 130 can use network 140 to communicate with one or more content providers 150. In response, the content providers 150 can provide the request content over network 140 and the network service provider 130 can transmit the content to the computing device 102.

Figure 5:
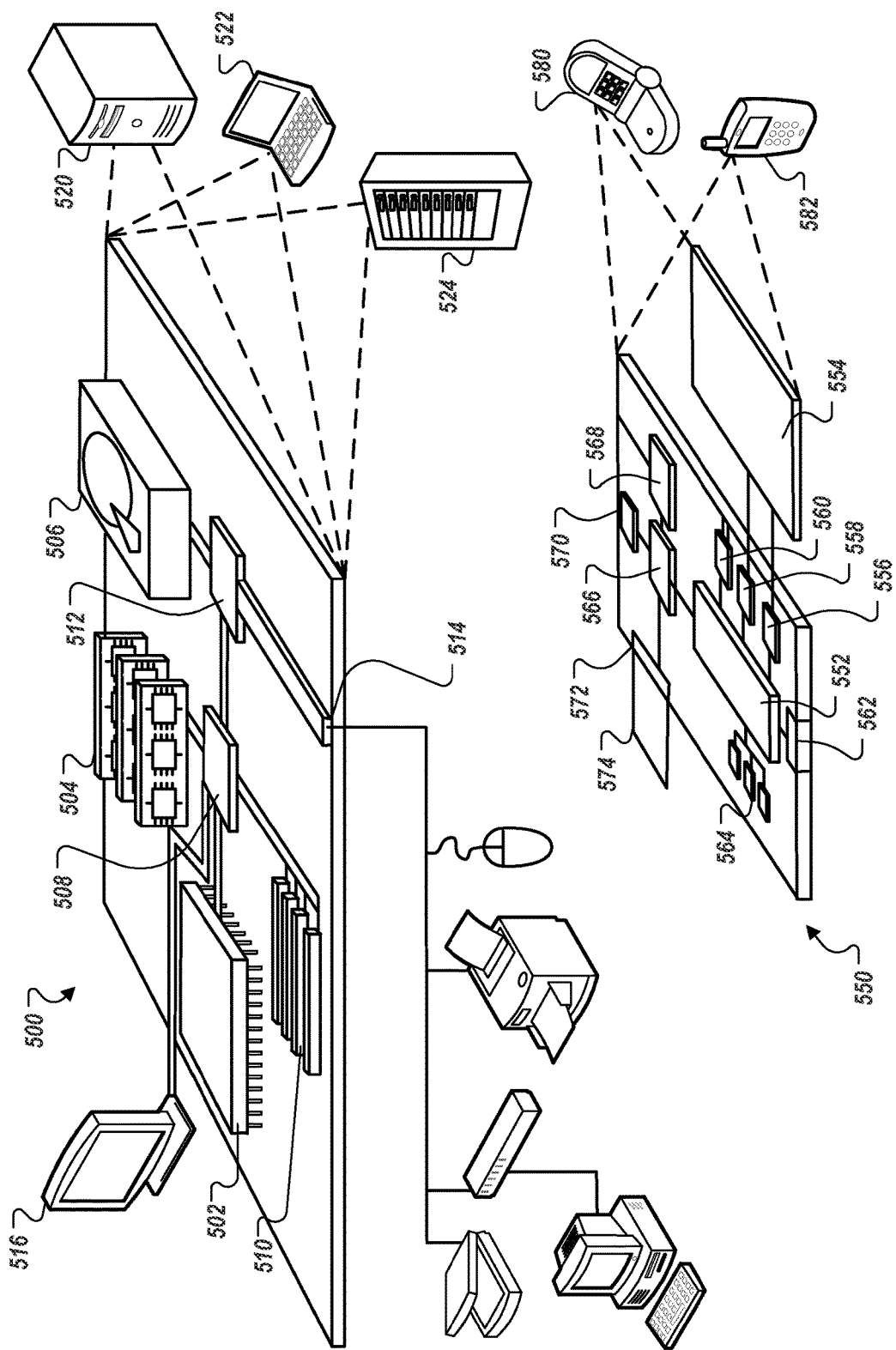
FIG. 5 shows an example computer system that can be used to implement systems and techniques described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a BLUETOOTH, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    obtaining, at a computing device, multiple whitelists that each identify one or more content providers that are accessible for free through a respective corresponding network service provider that is different from the computing device, wherein each of the respective particular network service providers also provides access to other content providers for which a fee is charged, a debit against an account is taken, or a subscription with the respective particular network service provider is required;

establishing, by the computing device, a particular network connection with a particular network service provider from among the network service providers;

identifying a network configuration that is stored on the computing device that indicates whether to restrict communication with content providers by the computing device to only communication that is free;

receiving, from a local application or service running on the computing device, a request to communicate with a particular content provider using the particular network connection, wherein the request to communicate originates from the local application or service running on the computing device;

determining, by the computing device and based on the network configuration:
  (i) whether the particular content provider that is identified by the received request is included in a whitelist for the particular network service provider with which the particular network connection is established from among the multiple whitelists that were obtained by the computing device and that correspond to the network service providers, and
  (ii) whether the network configuration that is stored on the computing device indicates to restrict communication with content providers by the computing device to only communication that is free; and in response to determining, by the computing device and based on the network configuration, (i) that the particular content provider that is identified by the received request is not included in the whitelist for the particular network service provider with which the particular network connection is established from among the multiple whitelists that were obtained by the computing device and that correspond to the network service providers, and (ii) that the network configuration that is stored on the computing device indicates to restrict communication with content providers by the computing device to only communication that is free, blocking, by the computing device, the request to communicate with the particular content provider that was received from the local application or the service running on the computing device, wherein the blocking is performed before the computing device has transmitted any external network communications responsive to the request to communicate, and wherein the blocking causes the computing device to locally terminate the request to communicate without any inbound or outbound external network communications for the request to communicate.

2. The computer-implemented method of claim 1, wherein the whitelist for the particular network service provider comprises one or more entries that are selected from the group consisting of: an internet protocol (IP) address, a uniform resource locator (URL), and a regular expression.

3. The computer-implemented method of claim 1, where the whitelist for the particular network service provider is different than one or more other whitelists for one or more other network service providers.

4. The computer-implemented method of claim 1, wherein obtaining the multiple whitelists comprises receiving the whitelist for the particular network service provider from another computing device as part of a push service associated with the particular network service.

5. The computer-implemented method of claim 1, wherein obtaining the multiple whitelists comprises receiving the whitelist for the particular network service provider by the computing device from another computing device as part of a pull service associated with the computing device.

6. The computer-implemented method of claim 1, wherein obtaining the multiple whitelists comprises receiving the whitelist for the particular network service provider by the computing device from another computing device as part of a push service associated with the other computing device.

7. The computer-implemented method of claim 1, wherein the particular network service provider is selected from the group consisting of: a mobile data network carrier and a wireless local area network provider.

8. The computer-implemented method of claim 1, where the particular network connection comprises a wireless network connection.

9. The computer-implemented method of claim 1, wherein the computing device comprises a mobile computing device.

10. The computer-implemented method of claim 1, further comprising:
  providing, on a display of the computing device, a user interface that includes controls for designating, at least, the network configuration to indicate whether or not to restrict communication with content providers by the computing device to only communication that is free; and
  receiving, through the user interface on the computing device, user input that specifies the network configuration.

11. The method of claim 10, further comprising:
  providing, on the display of the computing device, a notification to a user of the computing device that the computing device is operating under the network configuration to restrict communication with content providers by the computing device to only communication that is free.

12. The method of claim 1, further comprising:
  providing, on a display of the computing device, a message to a user of the computing device that the request to communicate with the particular content provider has been blocked.

13. The method of claim 1, further comprising:
  receiving, from an application that is running on the computing device, a request for information indicating whether the computing device is operating in a free mode of operation in which communication with content providers by the computing device is restricted to only communication that is free; and
  based on the identified network configuration, providing a response to the application.

14. A computing device comprising:
  one or more processors;
  an antenna configured for wireless communication;
  one or more storage devices storing instructions that are operable, when executed by the one or more processors, to cause the one or more processors to perform operations comprising:
    obtaining, at a computing device, multiple whitelists that each identify one or more content providers that are accessible for free through a respective corresponding network service provider that is different from the computing device, wherein each of the respective particular network service providers also provides access to other content providers for which a fee is charged, a debit against an account is taken, or a subscription with the respective particular network service provider is required;

establishing, by the computing device, a particular network connection with a particular network service provider from among the network service providers;

identifying a network configuration that is stored on the computing device that indicates whether to restrict communication with content providers by the computing device to only communication that is free;

receiving, from a local application or service running on the computing device, a request to communicate with a particular content provider using the particular network connection, wherein the request to communicate originates from the local application or service running on the computing device;

determining, by the computing device and based on the network configuration:

(i) whether the particular content provider that is identified by the received request is included in a whitelist for the particular network service provider with which the particular network connection is established from among the multiple whitelists that were obtained by the computing device and that correspond to the network service providers, and (ii) whether the network configuration that is stored on the computing device indicates to restrict communication with content providers by the computing device to only communication that is free; and in response to determining, by the computing device and based on the network configuration, (i) that the particular content provider that is identified by the received request is not included in the whitelist for the particular network service provider with which the particular network connection is established from among the multiple whitelists that were obtained by the computing device and that correspond to the network service providers, and (ii) that the network configuration that is stored on the computing device indicates to restrict communication with content providers by the computing device to only communication that is free, blocking, by the computing device, the request to communicate with the particular content provider that was received from the local application or the service running on the computing device, wherein the blocking is performed before the computing device has transmitted any external network communications responsive to the request to communicate, and wherein the blocking causes the computing device to locally terminate the request to communicate without any inbound or outbound external network communications for the request to communicate.

15. The device of claim 14, wherein the antenna is configured for communication from the group consisting of: mobile data network communication and wireless local area network communication.

16. The device of claim 14, wherein the whitelist comprises one or more entries that are selected from the group consisting of: an internet protocol (IP) address, a uniform resource locator (URL), and a regular expression.

17. The device of claim 14, wherein the whitelist for a particular network service provider is different than other whitelists for other network service providers.

18. The method of claim 1, wherein:
the computing device is running a network configuration manager that is programmed to:

receive all network communication requests generated by applications and services running on the computing device, and perform (i) the determining for each of the network communication requests and (ii) based on the determining, the blocking for appropriate ones of the network communication requests before the computing device has created network sockets for the appropriate ones of the network communication requests, causing the network configuration manager to not create the network sockets or to transmit network traffic for the appropriate ones of the network communication requests.

19. A non-transitory computer-readable medium storing instructions executable by one or more computers which, upon such execution, cause the one or more computers to perform operations comprising:

obtaining, at a computing device, multiple whitelists that each identify one or more content providers that are accessible for free through a respective corresponding network service provider that is different from the computing device, wherein each of respective the particular network service providers also provides access to other content providers for which a fee is charged, a debit against an account is taken, or a subscription with the respective particular network service provider is required;

establishing, by the computing device, a particular network connection with a particular network service provider from among the network service providers;

identifying a network configuration that is stored on the computing device that indicates whether to restrict communication with content providers by the computing device to only communication that is free;

receiving, from a local application or service running on the computing device, a request to communicate with a particular content provider using the particular network connection, wherein the request to communicate originates from the local application or service running on the computing device;

determining, by the computing device and based on the network configuration:

(i) whether the particular content provider that is identified by the received request is included in a whitelist for the particular network service provider with which the particular network connection is established from among the multiple whitelists that were obtained by the computing device and that correspond to the network service providers, and (ii) whether the network configuration that is stored on the computing device indicates to restrict communication with content providers by the computing device to only communication that is free; and in response to determining, by the computing device and based on the network configuration, (i) that the particular content provider that is identified by the received request is not included in the whitelist for the particular network service provider with which the particular network connection is established from among the multiple whitelists that were obtained by the computing device and that correspond to the network service providers, and (ii) that the network configuration that is stored on the computing device indicates to restrict communication with content providers by the computing device to only communication that is free, blocking, by the computing device, the request to communicate with the particular content provider that was received from the local application or the service running on the computing device, wherein the blocking is performed before the computing device has transmitted any external network communications responsive to the request to communicate, and wherein the blocking causes the computing device to locally terminate the request to communicate without any inbound or outbound external network communications for the request to communicate.

20. The method of claim 1, wherein determining, by the computing device and based on the network configuration whether the particular content provider that is identified by the received request is included in a whitelist for the particular network service provider with which the particular network connection is established from among the multiple whitelists that were obtained by the computing device and that correspond to the network service providers comprises:

identifying the particular network service provider with which the particular network connection is established;

determining from the whitelist for the particular network service provider that the whitelist is associated with the particular network service provider that is identified; and in response to determining from the whitelist for the particular network service provider that the whitelist is associated with the particular network service provider that is identified, determining to use the whitelist for the particular network service provider instead of a whitelist for another network service provider.

* * * * *

UNITED STATES PATENT AND TRADEMARK OFFICE
CERTIFICATE OF CORRECTION

| | | |
|---|---|---|
| PATENT NO. | : 10,122,591 B1 | Page 1 of 1 |
| APPLICATION NO. | : 13/798823 | |
| DATED | : November 6, 2018 | |
| INVENTOR(S) | : James Arnold Pack | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this
Fourteenth Day of May, 2019

Andrei Iancu
*Director of the United States Patent and Trademark Office*